A. J. SCHROEPFER.
DIRECTION INDICATOR FOR MOTOR VEHICLES.
APPLICATION FILED MAY 1, 1920.

1,370,846.  
Patented Mar. 8, 1921.

Witness.  
L. Olsen

Inventor.  
A. J. Schroepfer  
By Munn & Co  
Attorneys

UNITED STATES PATENT OFFICE.

ANDREW J. SCHROEPFER, OF VISALIA, CALIFORNIA.

DIRECTION-INDICATOR FOR MOTOR-VEHICLES.

1,370,846.  Specification of Letters Patent.  Patented Mar. 8, 1921.

Application filed May 1, 1920. Serial No. 378,192.

*To all whom it may concern:*

Be it known that I, ANDREW J. SCHROEPFER, a citizen of the United States, residing at Visalia, in the county of Tulare and State of California, have invented new and useful Improvements in Direction-Indicators for Motor-Vehicles, of which the following is a specification.

My invention relates to direction indicators for motor vehicles and has for its primary object to provide a simple and practical signal for indicating to an approaching vehicle the direction to be taken by the vehicle on which the indicator is installed.

In the accompanying drawing, I have illustrated the preferred manner of reducing the invention to practice. In said drawing—

Figure 1:
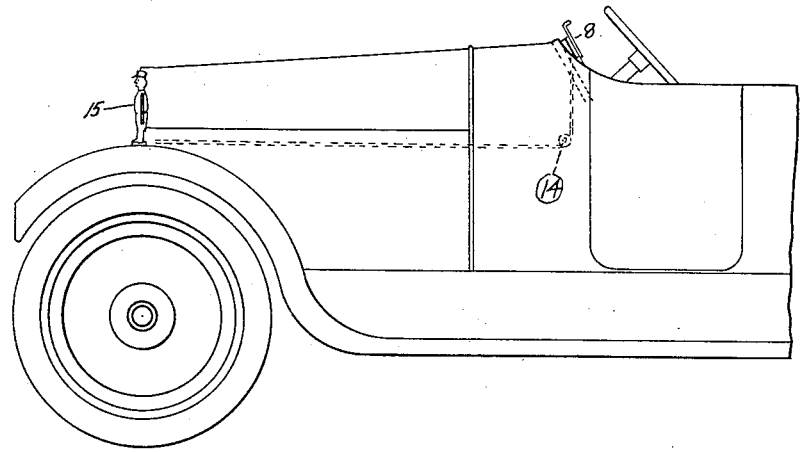
Figure 1 is a side view of the front part of a conventional type of motor vehicle illustrating the application of the invention.
Figure 2:
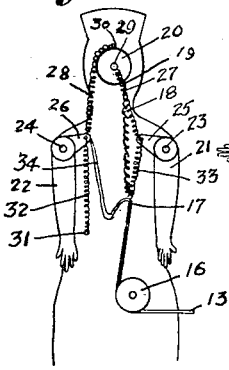
Fig. 2 is a vertical section of the indicator *per se*, showing the same inactive.
Figure 3:
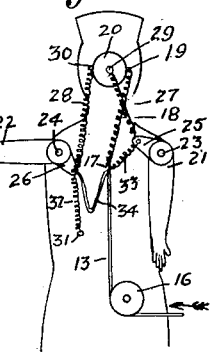
Fig. 3 is a similar view showing one of the indicator arms active.
Figure 4:
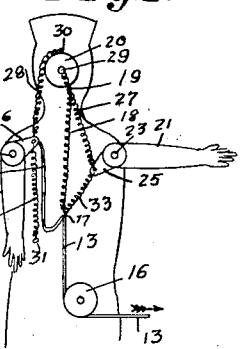
Fig. 4 is a similar view showing the other indicator arm active.
Figure 5:
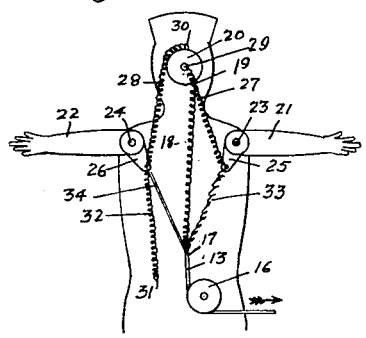
Fig. 5 is a similar view showing both of the indicator arms active.

Referring now to the drawings in detail: We will consider the invention, for the purpose of illustration as applied to a motor vehicle of the pleasure type having the usual dash board to which the control 5 may be applied. This control preferably includes a sector 6, having a mounting plate 7 to which the manipulating lever 8 is pivotally mounted as at 9, so that the same may be swung by grasping the handle 10, to various indicating positions on the sector 6. In order to maintain the lever 8 in the selective indicating position the sector 6 is notched as at 11 so that the pawl 12 which is carried by the lever may engage these notches for this purpose.

Fastened to the lever 8 is an operating cord or the like 13 which extends over the pulley 14 forwardly of the vehicle to the indicator 15 so that the indicator may be manipulated by the lever 8 as above stated.

While I have shown the indicator as applied on the front left hand fender of the vehicle, it is of course to be understood that the location of the indicator on the motor vehicle is immaterial so long as it is placed where it may be observed from either the front or rear of the vehicle.

To accomplish the desired results, I have elected to show the indicator *per se* as including a manikin with a mounting for the same so arranged that it will face the front of the vehicle with the arms thereof adapted to swing to horizontal position coinciding to that which the driver's arm would assume in indicating the direction to be taken by the vehicle. However, the manikin will permit a wider range of indicating positions than that which is possible by the driver's arms. This will be apparent as the description proceeds. In its preferred form this manikin 15 will provide a housing for the operating mechanism consisting of the pulley 16 around which the cord 13 passes.

This cord terminates as at 17 and to the end of which is fastened a spring or the like 18 the opposite end of which being secured to the ear 19 on the pulley or roller 20. This spring will normally exert a pull on the cord 13 so that the indicator arms 21 and 22 which are pivoted as at 23 and 24 may normally assumes a non-indicating or closed position. Each of the arms are provided with a toggled joint 25 and 26 which are presented inwardly. At the end of each of these toggled joints is connected the springs or the like 27 and 28, the opposite end of the spring 27 being connected to the pintle 29 of the pulley or roller 20 and the end of the spring 28 to the ear 30 at a diametrically opposite point on the roller 20 from the ear 19. Fastened to the toggled joint 26 and presented downwardly thereof with its opposite ends anchored as at 31 is another spring or the like 32, the normal influence of which is to overcome the influence of the spring 28 and in this manner hold the arm 22 down. Connected to the toggled joint 25 with its opposite ends connected to the end of the cord 13 is still another spring 33, the normal influence of which is to counteract the action of the spring 27.

In operation by throwing the lever 8 in a direction to impose a pull on the cord 13, the same will impart a pull on the spring 33 and overcome the influence of the spring 27, thus causing the arm 21 to be elevated in a horizontal position, to indicate that the vehicle is to take a direction to the right. We will consider, to effect this manipulation that the lever 8 is in a position on the sector 6 with the pawl 12 engaged in the next to the last notch on the right side of the sector. By throwing the lever still further to the right so that the pawl 12 will engage the last notch on the right hand side, a still further pull will be imposed on the cord 13 and in turn impose a pull on the strap 34 which is connected to the end of the cord 13 and the toggled joint 26 whereby the strap 34 will operate to raise the arm 22 thus both arms will be elevated to horizontal position to indicate that the vehicle is to come to a stand still.

Figure 6:
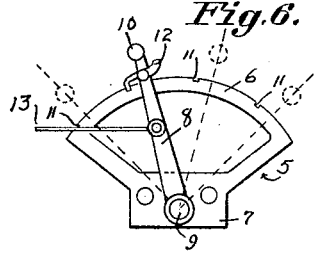
Fig. 6 is a detailed view of the control means.

The above clearly illustrates how the arm 21 or both the arm 21 and the arm 22 may be elevated. Now to manipulate arm 22 independent of the arm 21, the influence of the spring 28 is relied upon. To effect this, the normal tension under which the cord 13 is held is relieved by throwing the lever 8 on the left of the sector, thus permitting the roller 20 to turn under the influence of the spring 28 thus relieving the tension of the same and permitting the spring 32 to impose a downward pull on the toggle joint 26 and raise or elevate the arm 22 to indicate that the vehicle is to turn to the left. We will assume that the normal position of the lever 8 to maintain both the arms 21 and 22 at rest will be as that shown in Fig. 6.

The manikin may be constructed of any desirable material and may be formed of any unique shape.

I claim:

1. In a device of the character described, a pair of pivotally mounted indicating arms capable of a selective or collective movement to indicate three direction indicating positions, a series of springs connecting said arms some of which acting to maintain the arms in inactive position and others acting to move the arms to active position, a common controlling means for effecting the influence of said springs for moving the arms to any one of the said three positions, comprising a cord having a flexible connection with said arms and capable of being pulled in one direction to move one or both of the arms and capable of being released in an opposite direction to move the other one of the said arms.

2. A direction indicator for motor vehicles, embodying in its construction an indicator structure including a pair of pivoted arms, a series of springs for selectively or collectively moving said arms to and from active and inactive position, and means for controlling the influence of said springs comprising a pull cord maintained normally tort by the influence of some of the springs and capable of imposing a pull on some of the springs and a release on other of the springs and a manipulating lever for said pull cord having means associated therewith for mounting the same in a predetermined position in selectively manipulating said indicating arms.

ANDREW J. SCHROEPFER